(12) United States Patent
Chen et al.

(10) Patent No.: US 12,441,927 B1
(45) Date of Patent: Oct. 14, 2025

(54) PLUGGING MATERIAL, PREPARATION METHOD THEREFOR, AND USE THEREOF

(71) Applicant: Yangtze University, Jingzhou (CN)

(72) Inventors: Lifeng Chen, Jingzhou (CN); Jiamin Zhang, Jingzhou (CN); Minghao Xue, Jingzhou (CN); Weiwei Sheng, Jingzhou (CN); Huiyong Zeng, Jingzhou (CN); Zhaonian Zhang, Jingzhou (CN); Lei Hu, Jingzhou (CN); Mingchen Shi, Jingzhou (CN)

(73) Assignee: YANGTZE UNIVERSITY, Hubei (CN)

( * ) Notice: Subject to any disclaimer, the term of this patent is extended or adjusted under 35 U.S.C. 154(b) by 0 days.

(21) Appl. No.: 18/954,435

(22) Filed: Nov. 20, 2024

(30) Foreign Application Priority Data

Oct. 14, 2024 (CN) .......................... 202411436578.1

(51) Int. Cl.

| | |
|---|---|
| *C09K 8/42* | (2006.01) |
| *C08G 59/14* | (2006.01) |
| *C08G 59/17* | (2006.01) |
| *C08K 3/36* | (2006.01) |
| *C09K 8/44* | (2006.01) |
| *E21B 33/138* | (2006.01) |

(52) U.S. Cl.
CPC .......... *C09K 8/426* (2013.01); *C08G 59/1466* (2013.01); *C08G 59/1494* (2013.01); *C08K 3/36* (2013.01); *C09K 8/44* (2013.01); *E21B 33/138* (2013.01); *C08K 2201/011* (2013.01)

(58) Field of Classification Search
CPC ...... C09K 8/426; C09K 8/44; C08G 59/1466; C08G 59/1494; C08K 3/36; C08K 2201/011; E21B 33/138
See application file for complete search history.

(56) References Cited

U.S. PATENT DOCUMENTS

2023/0323151 A1* 10/2023 Joly .................. C09D 7/68
524/548

* cited by examiner

*Primary Examiner* — Crystal J Lee
(74) *Attorney, Agent, or Firm* — Ming Jiang; OPENPTO US LLC

(57) ABSTRACT

A plugging material is prepared from the following raw materials in terms of mass fractions, which include: 1 to 3.6 parts of PETA-modified bisphenol A epoxy resin, 1.5 to 2.4 parts of addition product of m-phenylenediamine and methacrylic acid, 0.12 to 0.17 parts of nanosilica dispersion liquid, with the remainder being water, such that the sum of the mass fractions of the aforementioned raw materials totals 100 parts. The preparation method includes: pouring a water phase mixture into a continuously stirred oil-phase mixture to form a gel-forming liquid through continued stirring; transferring the gel-forming liquid to be mixed with dibenzoyl peroxide, and stirring and reacting at a temperature of 50° C. to 120° C. to obtain the plugging material. The plugging material is resistant to high temperatures and high salinity, and exhibits strong plugging performance.

11 Claims, 4 Drawing Sheets

PLUGGING MATERIAL, PREPARATION METHOD THEREFOR, AND USE THEREOF

FIELD OF THE DISCLOSURE

The disclosure relates to the technical field of oilfield chemistry technology, in particular to a plugging material, preparation method therefor, and use thereof.

BACKGROUND

Low permeability and high heterogeneity have become the primary characteristics of oil reservoir exploitation in China. During secondary oil recovery, these characteristics typically lead to issues such as low reserve utilization rates and short water breakthrough cycles, significantly reducing development efficiency. Water plugging technology for oil wells is the most direct and effective means to address these problems, among which chemical water plugging is widely used due to its strong controllability and wide adaptability. However, when dealing with harsh conditions, conventional chemical water plugging systems often fail to meet the requirements.

Polymer microsphere systems represent an emerging water plugging technology, which can be classified into two types based on the injection method: pre-synthesized microspheres injected beforehand and in-situ self-generating microspheres formed after injection. Current research primarily focuses on pre-synthesized microspheres injected beforehand. The plugging mechanism involves selecting polymer microsphere particle sizes that match the pore throats in the formation and transporting them deep into the formation by the injection fluid. During injection, the microspheres absorb water and swell, thereby plugging high-permeability layers. In contrast, in-situ self-generating microspheres involve directly injecting a gel-forming fluid into the formation. The shear force during fluid flow gradually solidifies the fluid into hard microspheres within the pore throats. Water plugging is achieved through physical methods such as large particles wedging in fractures and small particles bridging gaps. Due to its unique plugging mechanism, this technology is considered an effective means of plugging micro-pore throats (20-50 μm) in low-permeability reservoirs. However, when existing research on polymer microsphere systems is applied in the field, numerous issues remain. The preparation and application process of pre-synthesized microspheres is complex, and they cannot withstand high-pressure plugging. Additionally, the gel-forming fluid for in-situ self-generating microspheres has a complex composition and poor stability, with a short phase transition time that makes it difficult to accurately reach the target formation. Controlling the microsphere production after phase transition is challenging, potentially damaging the reservoir and limiting the plugging mechanism.

A Chinese patent with publication number CN111234792A discloses a polymer microsphere water plugging and profile control agent. This system successfully prepares polymer microspheres through dispersion polymerization, with an initial particle size ranging from submicron to micron levels, exhibiting excellent swelling properties. Within the first seven days, the microspheres swell rapidly, ultimately achieving a swelling ratio of up to 120 times and remaining stable for up to six months under conditions of 90° C. and a mineralization degree of 20,000 mg/L. Under experimental conditions, the system demonstrates outstanding water plugging and profile adjustment performance, but its application process remains complex. According to the patent disclosure, the effective content of the system is as high as 26.3%, indicating a relatively high preparation cost, unsuitable for direct field application.

Another Chinese patent with publication number CN113025293A discloses an epoxy resin self-generating particle profile adjustment system and its application method. This system prepares a stable O/W emulsion by mixing epoxy resin, emulsifier, and dispersant into tap water under conditions of a temperature of 40 to 65° C. and a stirring speed of 600 r/min. Prior to injection, a corresponding proportion of curing agent is mixed in at a high stirring speed of 1,000 r/min. The resulting gel-forming fluid gradually begins to solidify at a formation temperature above 70° C. and fully solidifies within 12 hours. Depending on the shear force provided, the formed microsphere particle size distribution ranges from 60 to 1,000 m. Subsequent dual-tube experiments verify that the system can effectively plug high-permeability layers even when the permeability contrast is 10.4. However, the original preparation process does not consider the impact of mineralization degree on the stability of the gel-forming fluid. The required stirring speed of 1,000 r/min during injection poses high requirements for field construction conditions, and it is impossible to control the in-layer solidification time after system injection.

It can be seen that, despite the progress made by the above two systems under ideal experimental conditions, they have not fully considered the actual reservoir conditions, such as the comprehensive and complex factors of high temperature, high salinity, low permeability, and high heterogeneity. Therefore, it is necessary to develop a novel polymer microsphere plugging system based on existing research that is resistant to high temperature and high salinity, exhibits strong plugging performance, and is suitable for micro-channel environments.

SUMMARY

The purpose of this disclosure is to provide a plugging material, preparation method therefor, and use thereof to solve the technical problem in the existing technology that polymer microsphere plugging systems fail to meet the requirements of high temperature and high salinity resistance, as well as strong plugging performance.

In order to solve the above technical problems, this disclosure provides a plugging material, which is prepared from the following raw materials in terms of mass fractions, which comprise: 1 to 3.6 parts of PETA-modified bisphenol A epoxy resin, 1.5 to 2.4 parts of addition product of m-phenylenediamine and methacrylic acid, 0.12 to 0.17 parts of nanosilica dispersion liquid, with the remainder being water, such that the sum of the mass fractions of the aforementioned raw materials totals 100 parts.

Furthermore, the raw materials further comprise 0 to 0.14 parts of dibenzoyl peroxide.

Furthermore, the PETA-modified bisphenol A epoxy resin is prepared through the following steps: mixing bisphenol A epoxy resin, PETA, and a first catalyst to obtain a mixture, and stirring the mixture under a temperature of 40 to 50° C. to obtain the PETA-modified bisphenol A epoxy resin.

Furthermore, the mass ratio of the bisphenol A epoxy resin to the PETA is 1:0.25 to 1:0.3; and/or, the first catalyst is triphenylphosphine, with an addition amount of 0.1% to 2% of the total mass of the bisphenol A epoxy resin and the PETA.

Furthermore, the PETA-modified bisphenol A epoxy resin is obtained by reacting under nitrogen protection at a temperature of 40° C. to 50° C., with a stirring speed of 100 r/min to 200 r/min, for a duration of 2 h to 4 h.

Furthermore, the addition product of m-phenylenediamine and methacrylic acid is prepared through the following steps:

mixing m-phenylenediamine, methacrylic acid, and a second catalyst to obtain a mixture, and stir the mixture under a temperature of 25° C. to 60° C. to obtain the addition product of m-phenylenediamine and methacrylic acid.

Furthermore, the mass ratio of the m-phenylenediamine to the methacrylic acid is 1:0.8 to 1:1.6; and/or, the second catalyst is potassium carbonate, with an addition amount of 1% to 5% of the total mass of the m-phenylenediamine and the methacrylic acid.

This disclosure also provides a preparing method for plugging material, wherein the plugging material is prepared from the following raw materials in terms of mass fractions, which comprise: 1 to 3.6 parts of PETA-modified bisphenol A epoxy resin, 1.5 to 2.4 parts of addition product of m-phenylenediamine and methacrylic acid, 0.12 to 0.17 parts of nanosilica dispersion liquid, with the remainder being water, such that the sum of the mass fractions of the aforementioned raw materials totals 100 parts;

the preparing method comprises the following steps:

Step S1: preparation of oil phase and water phase: mixing PETA-modified bisphenol A epoxy resin and the addition product of m-phenylenediamine and methacrylic acid to form an oil phase mixture; mixing nanosilica dispersion liquid with water to obtain a water phase mixture;

Step S2: emulsification process: pouring the water phase mixture into the continuously stirred oil phase mixture and continue stirring to form a gel-forming liquid;

Step S3: curing process: transferring the gel-forming liquid and mixing it with dibenzoyl peroxide; stirring and reacting at a temperature of 50° C. to 120° C. to obtain the plugging material.

Furthermore, in step S2, the duration of continued stirring is 20 to 30 minutes; and/or, in step S3, the stirring and reaction time at a temperature of 50° C. to 120° C. is 4 hours to 12 hours.

This disclosure also provides use of the plugging material in reservoir water plugging.

Compared with existing technologies, the beneficial effects of this disclosure are: the plugging material proposed in this disclosure is prepared from the following raw materials in terms of mass fractions, which comprise: 1 to 3.6 parts of PETA-modified bisphenol A epoxy resin, 1.5 to 2.4 parts of addition product of m-phenylenediamine and methacrylic acid, 0.12 to 0.17 parts of nanosilica dispersion liquid, with the remainder being water, such that the sum of the mass fractions of the aforementioned raw materials totals 100 parts. In the PETA-modified bisphenol A epoxy resin, PETA molecules embedded into the bisphenol A epoxy resin chains, endowing the microsphere surfaces with potential reactive crosslinking sites. Under appropriate activation conditions, crosslinking reactions occur between sites on adjacent microsphere surfaces, leading to aggregation and the formation of a multi-microsphere crosslinking structure. This realizes a synergistic effect between physical and chemical properties, significantly enhancing the plugging capability of the system after phase transition. Furthermore, with the synergistic action of other raw materials, the obtained plugging material exhibits high temperature and high salt resistance, along with robust plugging performance.

DETAILED DESCRIPTION OF PREFERRED EMBODIMENTS

Figure 1:
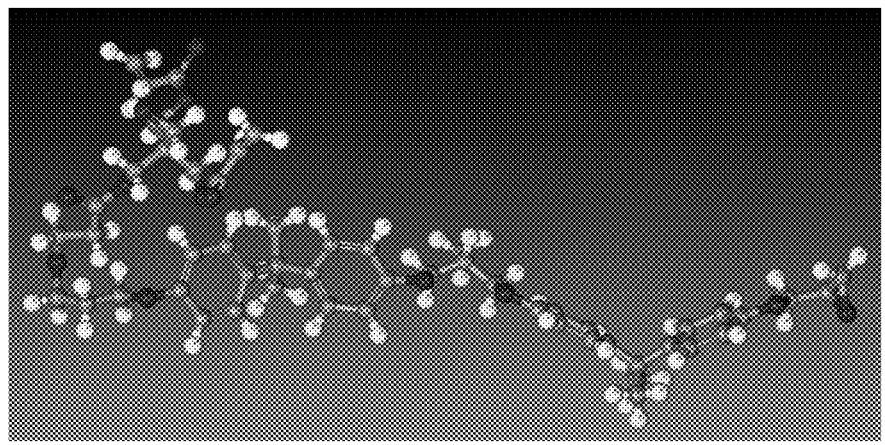
FIG. 1 is a structural schematic diagram of the PETA-modified bisphenol A epoxy resin (n=1) in this disclosure.

The "range" disclosed in this application is defined in terms of a lower limit and an upper limit. A given range is specified by selecting a lower limit and an upper limit, which define the boundaries of a particular range. The range defined in this manner may include or exclude the endpoint values, and may be combined arbitrarily, meaning that any lower limit can be combined with any upper limit to form a range. For example, if the ranges of 60 to 120 and 80 to 110 are listed for a specific parameter, it is understood that the ranges of 60 to 110 and 80 to 120 are also contemplated. Furthermore, if the minimum range values of 1 and 2 are listed, and if the maximum range values of 3, 4, and 5 are listed, then the following ranges are all contemplated: 1 to 3, 1 to 4, 1 to 5, 2 to 3, 2 to 4, and 2 to 5. In this application, unless otherwise specified, a numerical range "a to b" represents a shorthand notation for any real number combination between a and b, where both a and b are real numbers. For instance, the numerical range "0 to 5" implies that all real numbers between 0 and 5 are fully enumerated herein, and "0 to 5" serves merely as an abbreviated representation of these numerical combinations. Additionally, when a parameter is stated as an integer ≥2, it is equivalent to disclosing that the parameter can be, for example, the integers 2, 3, 4, 5, 6, 7, 8, 9, 10, 11, 12, and so on.

Unless specifically stated otherwise, the terms "including" and "comprising" mentioned in this application are intended to be open-ended, but they can also be construed as closed-ended. For example, the use of "including" and "comprising" can imply that other components not listed may also be included or comprised, or it can mean that only the listed components are included or comprised.

Unless specifically stated otherwise, in this application, the term "or" is inclusive. For instance, the phrase "A or B" signifies "A, B, or both A and B." More specifically, the condition "A or B" is satisfied by any of the following: A being true (or present) and B being false (or absent); A being false (or absent) and B being true (or present); or both A and B being true (or present).

This specific embodiment provides a plugging material prepared from the following raw materials in parts by mass, comprising: 1 to 3.6 parts of PETA-modified bisphenol A epoxy resin, 1.5 to 2.4 parts of the addition product of m-phenylenediamine and methacrylic acid, 0.12 to 0.17 parts of nanosilica dispersion liquid, with the remainder being water, such that the sum of the parts by mass of the aforementioned raw materials totals 100 parts.

In some embodiments, the raw materials further comprise 0 to 0.14 parts of dibenzoyl peroxide. The addition of dibenzoyl peroxide introduces surface self-crosslinking groups that can be activated by dibenzoyl peroxide even at low temperatures, enabling self-crosslinking of the microspheres at low temperatures.

In some embodiments, the PETA-modified bisphenol A epoxy resin is prepared by the following steps:

mixing bisphenol A epoxy resin, PETA, and a first catalyst, and reacting at a temperature of 40° C. to 50° C. under nitrogen protection with a stirring speed of 100 r/min to 200 r/min for 2 h to 4 h to obtain the PETA-modified bisphenol A epoxy resin. The mass ratio of bisphenol A epoxy resin to PETA is 1:0.25 to 0.3. The first catalyst is triphenylphosphine, and the amount of the first catalyst added is 0.1% to 2% of the total mass of bisphenol A epoxy resin and PETA. In this disclosure, PETA is used to modify bisphenol A epoxy resin, successfully achieving self-crosslinking between adjacent microspheres and effectively improving the plugging performance of the material. Furthermore, the PETA molecule contains three unsaturated double bonds, which can undergo copolymerization with epoxy resin monomers. By precisely controlling the amount of PETA, the type of the catalyst, and the reaction temperature and time, some of the unsaturated double bonds can participate in copolymerization, embedding the PETA molecules into the epoxy resin chains. The modified molecular structure is schematically shown in FIG. 1. The unsaturated double bonds that do not participate in copolymerization are located on the particle surface, with some participating in the reaction during the curing process and some remaining for automatic crosslinking at high temperatures (>100° C.). Under medium to low temperatures (50° C. to 100° C.), an activator is needed to promote the crosslinking reaction.

In some embodiments, the addition product of m-phenylenediamine and methacrylic acid is prepared through the following steps:

mixing m-phenylenediamine, methacrylic acid, and a second catalyst, and stirring the mixture under a temperature range of 25° C. to 60° C. to allow the reaction to proceed. The mass ratio of m-phenylenediamine to methacrylic acid is 1:0.8 to 1.6. The second catalyst is potassium carbonate, and the amount of the second catalyst added is 1% to 5% of the total mass of m-phenylenediamine and methacrylic acid.

Figure 2:
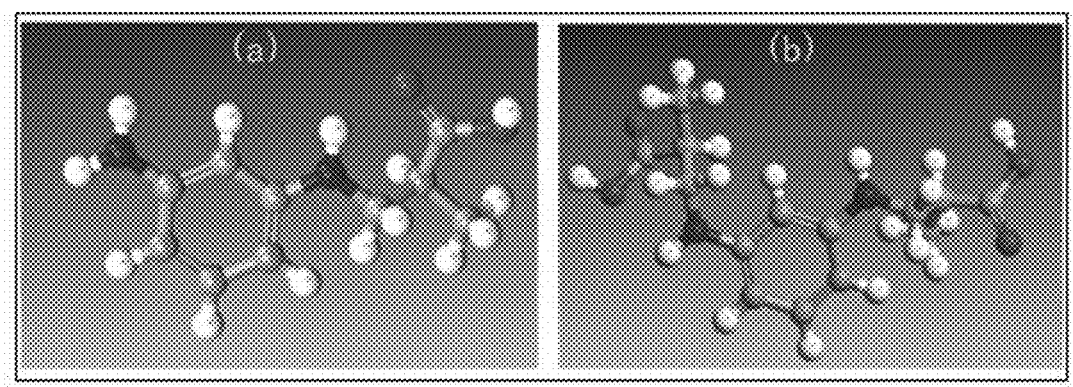
FIG. 2 is the molecular structural schematic diagrams of two different monomer forms for synthesizing the emulsified curing agent in this disclosure.

In this disclosure, the phase inversion time of the system can be effectively controlled by adjusting the ratio of m-phenylenediamine to methacrylic acid during synthesis, as well as the amount of PETA-modified bisphenol A epoxy resin used. Furthermore, during the reaction, depending on the amount of methacrylic acid used, either a mono-addition product or a bis-addition product will form. The more complete the addition reaction, the greater the number of secondary amines produced. The monomeric molecular structures of these two products are shown in FIG. 2, where figure (a) in FIG. 2 represents the mono-addition product and figure (b) in FIG. 2 represents the bis-addition product. Both addition products are aromatic diamines. The reaction formula for the curing process of polyamine and epoxy resin is as follows:

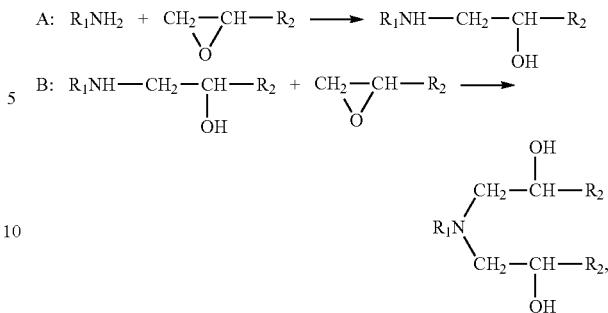

It should be noted that $R_1$ and $R_2$ represent chain segments after removing the reactive groups. The above reaction formula is only used to illustrate the process of amine-based curing of epoxy resin by polyamines. Since only the amine groups react with the epoxy groups during the curing process, it is not necessary to show the specific details of the reaction.

Initially, the reactive hydrogen of the primary amine reacts with the epoxy group, generating a secondary amine. This secondary amine continues to react to form a tertiary amine, ultimately leading to the formation of a cross-linked network structure. The generated tertiary amine has a catalytic effect on the curing reaction. Aromatic polyamines, due to the steric hindrance of their aromatic rings, exhibit longer reaction times for both steps. Therefore, the more secondary amines present in the addition products, the shorter the time required to form tertiary amines, resulting in a shortened curing and phase inversion time. Conversely, a lower content of secondary amines leads to an extended curing and phase inversion time. Adjusting the amount of the main agent directly affects the content of epoxy groups, thereby allowing for the adjustment of the phase inversion time within a certain range.

In this disclosure, PETA-modified bisphenol A epoxy resin serves as the main agent, the addition product of m-phenylenediamine and methacrylic acid acts as the emulsified curing agent, dibenzoyl peroxide is used as the activator, nanosilica dispersion liquid functions as the dispersant, and water constitutes the dispersed phase of the system. The aromatic rings in the skeleton of PETA-modified bisphenol A epoxy resin provide robustness and heat resistance, while ether bonds contribute chemical resistance. The epoxy groups offer reactivity, and the modified branches retain unsaturated double bonds that did not participate in copolymerization, providing crosslinking sites on the surface of microspheres and thus establishing an excellent reaction foundation. The addition product of m-phenylenediamine and methacrylic acid possesses hydrophilic carboxyl groups and lipophilic aromatic skeletons, exhibiting an amphiphilic structure that makes it an ideal emulsifier. Additionally, it contains amino groups that can react with epoxy groups, playing a role in curing the epoxy resin. Dibenzoyl peroxide decomposes at lower temperatures to generate radicals, initiating radical polymerization of acrylate groups in the PETA molecular chain. The nanosilica dispersion liquid forms a mechanical barrier on the surface of uncured particles, effectively preventing premature aggregation of these particles and further enhancing the compressive strength of the hard microspheres after phase inversion.

This specific embodiment also proposes a preparation method for the plugging material, which comprises the following steps:

Step S1: preparation of oil phase and water phase: mixing PETA-modified bisphenol A epoxy resin and the addition product of m-Phenylenediamine and methacrylic acid to form an oil phase mixture; mixing nanosilica dispersion liquid with water to obtain a water phase mixture;

Step S2: emulsification process: pouring the water phase mixture into the continuously stirred oil phase mixture and continue stirring for 20 to 30 minutes to form a gel-forming liquid;

Step S3: curing process: transferring the gel-forming liquid and mixing it with dibenzoyl peroxide; stirring and reacting at a temperature of 50° C. to 120° C. for 4 to 12 hours to obtain the plugging material.

In addition, this specific embodiment also proposes the use of the plugging material or the plugging material prepared by the above method in reservoir water plugging.

In order to make the purpose, technical solutions, and advantages of this disclosure clearer and more understandable, the following provides a detailed explanation of this disclosure in conjunction with the accompanying drawings and embodiments. It should be understood that the specific embodiments described here are solely for the purpose of illustrating this disclosure and are not intended to limit its scope.

In this disclosure, references to "some embodiments," "the present embodiment," and examples, among others, describe subsets of all possible embodiments. However, it should be understood that "some embodiments" can be the same subset or different subsets of all possible embodiments and can be combined with each other without conflict.

If the application document contains descriptions using terms like "first/second," the following explanation is added: In the following descriptions, the terms "first," "second," and "third" are merely used to distinguish similar objects and do not imply a specific ordering of the objects. It is understood that "first," "second," and "third" can be interchanged in their specific order or sequence, where permissible, so that the embodiments described here can be implemented in an order other than that illustrated or described here.

In this embodiment, the term "and/or" is merely a way to describe the associative relationship between related objects, indicating that there can be three possible relationships. For example, "object A and/or object B" can represent the following three scenarios: object A exists alone, both object A and object B exist simultaneously, and object B exists alone.

Below are the embodiments of the present application. The embodiments described below are exemplary and are intended solely for the purpose of explaining the present application, rather than limiting its scope. For embodiments where specific techniques or conditions are not indicated, the techniques or conditions described in the literature within the field or according to the product specifications shall be followed. Reagents or instruments for which the manufacturer is not specified are all conventional products that can be obtained commercially.

In the following embodiments or comparative embodiment, the water mentioned is simulated formation water with a mineralization degree of 30,000 mg/L.

Nanosilica dispersion liquid: supplied by Wuhan Jiyesheng Chemical Co., Ltd., China, with an effective content of 30%.

The bisphenol A epoxy resin has a viscosity of 2500 mPa s for the monomer at 40° C. and an epoxy value ranging from 0.48 to 0.54.

In the following embodiments or comparative embodiment, The PETA-modified bisphenol A epoxy resin is prepared through the following steps: mixing bisphenol A epoxy resin with PETA in a mass ratio of 1:0.25; then, adding triphenylphosphine as the catalyst, with the catalyst added at 0.5% of the total mass of the reactants. Stirring the mixture at a temperature of 40° C. under nitrogen protection at a speed of 200 revolutions per minute for 3 hours to obtain the product.

In the following embodiments, the addition product of m-phenylenediamine and methacrylic acid is prepared through the following steps: mixing m-phenylenediamine and methacrylic acid in a mass ratio of 1:0.8, and adding potassium carbonate accounting for 2% of the total mass of m-phenylenediamine and methacrylic acid. Stirring the mixture at a temperature of 45° C. for 4 hours to obtain the product.

Embodiment 1

This embodiment proposes a microchannel-controllable self-phase-change microsphere plugging system (i.e., the plugging material) prepared from the following raw materials in parts by mass. The raw materials comprise: 1 part of PETA-modified bisphenol A epoxy resin, 1.5 parts of the addition product of m-phenylenediamine and methacrylic acid, 0.14 parts of dibenzoyl peroxide, 0.17 parts of nanosilica dispersion liquid, and the remainder being water, with the sum of the parts by mass of the aforementioned raw materials totaling 100 parts.

The preparation method for the microchannel-controllable self-phase-change microsphere plugging system is as follows, according to the aforementioned ratio of raw materials:

Step S1: preparation of the oil phase and water phase of the system: at room temperature, mixing 1 part of PETA-modified bisphenol A epoxy resin and 1.5 parts of the addition product of m-phenylenediamine and methacrylic acid, and stirring at a speed of 300 r/min for 15 minutes to form an oil phase mixture; simultaneously, mixing 0.17 parts of nanosilica dispersion liquid with 97.19 parts of water, and stirring at a speed of 300 r/min for 10 minutes to prepare a water phase mixture;

Step S2: emulsification process: slowly pouring the water phase mixture into the continuously stirred oil phase mixture, maintaining a stirring speed of 300 r/min for 25 minutes to form a stable gel-forming liquid;

Step S3: curing process: transferring the gel-forming liquid to a three-necked flask and adding 0.14 parts of dibenzoyl peroxide; controlling the water bath temperature at 50° C. and continue stirring at a speed of 300 r/min until the system completely undergoes phase inversion to form hard microspheres.

Embodiment 2

This embodiment proposes a microchannel-controllable self-phase-change microsphere plugging system (i.e., plugging material) prepared from the following raw materials in parts by mass. The raw materials comprise: 1 part of PETA-modified bisphenol A epoxy resin, 1.5 parts of the addition product of m-phenylenediamine and methacrylic acid, 0.08 parts of dibenzoyl peroxide, 0.17 parts of nanosilica dispersion liquid, and the remainder being water, with the sum of the parts by mass of the aforementioned raw materials totaling 100 parts.

The preparation method for the microchannel-controllable self-phase-change microsphere plugging system is as follows, according to the aforementioned ratio of raw materials:
- Step S1: preparation of oil phase and water phase of the system: at room temperature, mixing the PETA-modified bisphenol A epoxy resin with the addition product of m-phenylenediamine and methacrylic acid, and stirring at a speed of 300 r/min for 15 minutes to form an oil phase mixture; simultaneously, mixing the nanosilica dispersion liquid with water, and stirring at a speed of 300 r/min for 10 minutes to prepare a water phase mixture;
- Step S2: emulsification process: slowly pouring the water phase mixture into the continuously stirred oil phase mixture, maintaining a stirring speed of 300 r/min for 25 minutes to form a stable gel-forming liquid;
- Step S3: curing process: transferring the gel-forming liquid to a three-necked flask and adding dibenzoyl peroxide; controlling the water bath temperature at 70° C. and continue stirring at a speed of 300 r/min until the system completely undergoes phase inversion to form hard microspheres.

Embodiment 3

This embodiment proposes a microchannel-controllable self-phase-change microsphere plugging system (i.e., plugging material) prepared from the following raw materials in parts by mass. The raw materials comprise: 1.8 parts of PETA-modified bisphenol A epoxy resin, 1.8 parts of the addition product of m-phenylenediamine and methacrylic acid, 0.03 parts of dibenzoyl peroxide, 0.12 parts of nanosilica dispersion liquid, and the remainder being water. The sum of the parts by mass of the aforementioned raw materials totals 100 parts.

The preparation method for the microchannel-controllable self-phase-change microsphere plugging system of this embodiment is as follows, according to the aforementioned ratio of raw materials:
- Step S1: preparation of oil phase and water phase of the system: at room temperature, mixing the PETA-modified bisphenol A epoxy resin with the addition product of m-phenylenediamine and methacrylic acid, and stirring at a speed of 300 r/min for 15 minutes to form an oil phase mixture; simultaneously, mixing the nanosilica dispersion liquid with 97.19 parts of water, and stirring at a speed of 300 r/min for 10 minutes to prepare a water phase mixture;
- Step S2: emulsification process: slowly pouring the water phase mixture into the continuously stirred oil phase mixture, maintaining a stirring speed of 300 r/min for 25 minutes to form a stable gel-forming liquid;
- Step S3: curing process: transferring the gel-forming liquid to a three-necked flask and add dibenzoyl peroxide; controlling the water bath temperature at 90° C. and continue stirring at a speed of 300 r/min until the system completely undergoes phase inversion to form hard microspheres.

Embodiment 4

This embodiment proposes a microchannel-controllable self-phase-change microsphere plugging system (i.e., plugging material) prepared from the following raw materials in parts by mass. The raw materials comprise: 3.6 parts of PETA-modified bisphenol A epoxy resin, 2 parts of the addition product of m-phenylenediamine and methacrylic acid, 0 parts of dibenzoyl peroxide, 0.16 parts of nanosilica dispersion liquid, and the remainder being water. The sum of the parts by mass of the aforementioned raw materials totals 100 parts.

The preparation method for the microchannel-controllable self-phase-change microsphere plugging system is as follows, according to the aforementioned ratio of raw materials:
- Step S1: preparation of the oil phase and water phase of the system: at room temperature, mixing the PETA-modified bisphenol A epoxy resin with the addition product of m-phenylenediamine and methacrylic acid, and stirring at a speed of 300 r/min for 15 minutes to form an oil phase mixture; simultaneously, mixing the nanosilica dispersion liquid with water, and stirring at a speed of 300 r/min for 10 minutes to prepare a water phase mixture;
- Step S2: emulsification process: slowly pouring the water phase mixture into the continuously stirred oil phase mixture, maintaining a stirring speed of 300 r/min for 25 minutes to form a stable gel-forming liquid;
- Step S3: curing process: transferring the gel-forming liquid to a three-necked flask, controlling the oil bath temperature at 110° C., and continue stirring at a speed of 300 r/min until the system completely undergoes phase inversion to form hard microspheres.

Embodiment 5

This embodiment proposes a microchannel-controllable self-phase-change microsphere plugging system (i.e., plugging material) prepared from the following raw materials in parts by mass. The raw materials comprise: 3.6 parts of PETA-modified bisphenol A epoxy resin, 2.4 parts of the addition product of m-phenylenediamine and methacrylic acid, 0 parts of dibenzoyl peroxide, 0.16 parts of nanosilica dispersion liquid, and the remainder being water. The sum of the parts by mass of the aforementioned raw materials totals 100 parts.

The preparation method for the microchannel-controllable self-phase-change microsphere plugging system is as follows, according to the aforementioned ratio of raw materials:
- Step S1: Preparation of oil phase and water phase of the system: at room temperature, mixing the PETA-modified bisphenol A epoxy resin with the addition product of m-phenylenediamine and methacrylic acid, and stirring at a speed of 300 r/min for 15 minutes to form an oil phase mixture; simultaneously, mixing the nanosilica dispersion liquid with water, and stirring at a speed of 300 r/min for 10 minutes to prepare a water phase mixture;
- Step S2: emulsification process: pouring the water phase slowly into the continuously stirred oil phase, maintaining a stirring speed of 300 r/min for 25 minutes to form a stable gel-forming liquid;
- Step S3: curing process: transferring the gel-forming liquid to a three-necked flask, controlling the oil bath temperature at 120° C., and continue stirring at a speed of 300 r/min until the system completely undergoes phase inversion to form hard microspheres.

Embodiment 6

The difference between the plugging material in Embodiment 6 and Embodiment 3 lies solely in the preparation of the addition product of m-phenylenediamine and methacrylic acid. Specifically, the mass ratio of m-phenylenediamine to methacrylic acid in the addition reaction is 1:1 in Embodiment 6, while the other raw materials and preparation methods are the same as those in Embodiment 3.

Embodiment 7

The difference between the plugging material in Embodiment 7 and Embodiment 3 lies solely in the preparation of the addition product of m-phenylenediamine and methacrylic acid. Specifically, the mass ratio of m-phenylenediamine to methacrylic acid in the addition reaction is 1:1.2 in Embodiment 7, while the other raw materials and preparation methods remain the same as those in Embodiment 3.

Embodiment 8

The difference between the plugging material in Embodiment 8 and Embodiment 3 lies solely in the preparation of the addition product of m-phenylenediamine and methacrylic acid. Specifically, the mass ratio of m-phenylenediamine to methacrylic acid in the addition reaction is 1:1.4 in Embodiment 8, while the other raw materials and preparation methods are identical to those in Embodiment 3.

Embodiment 9

The difference between the plugging material in Embodiment 9 and Embodiment 3 lies solely in the preparation of the addition product of m-phenylenediamine and methacrylic acid. Specifically, the mass ratio of m-phenylenediamine to methacrylic acid in the addition reaction is 1:1.6 in Embodiment 9, while the other raw materials and preparation methods remain unchanged from those in Embodiment 3.

Embodiment 10

The difference between the plugging material in Embodiment 10 and Embodiment 3 lies solely in the preparation of the addition product of m-phenylenediamine and methacrylic acid and the amount of PETA-modified bisphenol A epoxy resin used. Specifically, in Embodiment 10 the mass ratio of m-phenylenediamine to methacrylic acid in the addition reaction is 1:0.8, and the addition amount of PETA-modified bisphenol A epoxy resin is 2.4 parts. The other raw materials and preparation methods are identical to those in Embodiment 3.

Comparative Embodiment 1

This embodiment proposes a microchannel-controllable self-phase-change microsphere plugging system (i.e., plugging material) prepared from the following raw materials in specified parts by mass. The raw materials comprise: 1.8 parts of bisphenol A epoxy resin, 1.8 parts of the addition product of m-phenylenediamine and methacrylic acid, 0.12 parts of nanosilica dispersion liquid, 0.03 parts of dibenzoyl peroxide, and the remainder being water. The sum of the parts by mass of the aforementioned raw materials is 100 parts.

The preparation method for the microchannel-controllable self-phase-change microsphere plugging system in this embodiment is as follows, according to the above-mentioned ratio of raw materials:

Step S1: preparation of oil phase and water phase of the system: at room temperature, mixing bisphenol A epoxy resin and the addition product of m-phenylenediamine and methacrylic acid, and stirring at a speed of 300 r/min for 15 minutes to form an oil phase mixture; simultaneously, mixing nanosilica dispersion liquid with water, and stirring at a speed of 300 r/min for 10 minutes to prepare a water phase mixture;

Step S2: emulsification process: pouring the water phase mixture slowly into the continuously stirred oil phase mixture, maintaining a stirring speed of 300 r/min for 25 minutes to form a stable gel-forming liquid;

Step S3: curing process: transferring the gel-forming liquid to a three-necked flask and adding dibenzoyl peroxide; controlling the water bath temperature at 90° C. and continue stirring at a speed of 300 r/min until the system completely undergoes phase inversion to form hard microspheres.

Test Group 1:

Preparing the gel-forming liquids from Embodiment 1-Embodiment 5 above using simulated formation water with salinities of 10000 mg/L, 20000 mg/L, 30000 mg/L, and 50000 mg/L, respectively. Observing the phase transition time of the systems and the morphology of the microspheres after phase transition, the morphology of the microspheres after phase transition are shown in FIG. 3 and FIG. 4.

Figures 3, 4:
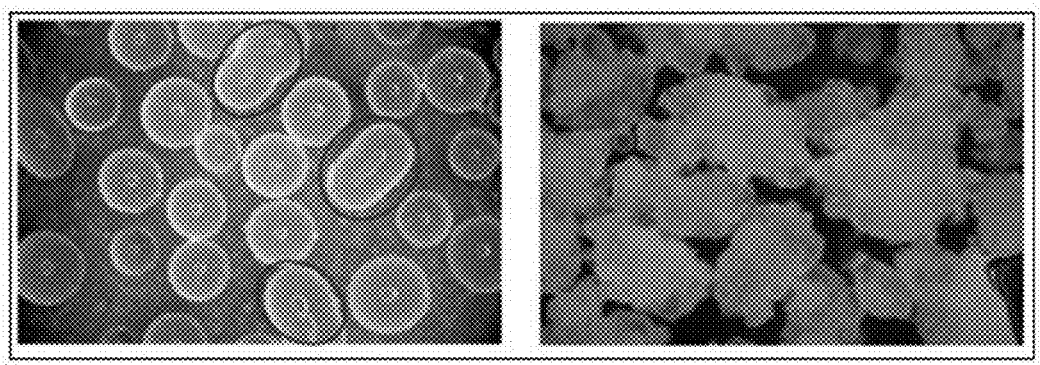
FIG. 3 is the phase inversion time and microsphere morphology of the system under different mineralization degrees for Test Group 1.
FIG. 4 is the morphology of the crosslinking structure formed between microspheres prepared in Embodiment 1-Embodiment 5 of Test Group 1.

Please refer to FIG. 3 and FIG. 4. As can be seen from FIG. 3, with the increase in the salinity of the simulated formation water, the majority of the microspheres prepared at the same temperature exhibit improved dispersion, increased sphericity, and a narrowed particle size range. This indicates that the microsphere plugging system of this disclosure can effectively adapt to high-salinity environments. As can be seen from FIG. 4, a small portion of adjacent microspheres can form a cross-linked structure.

Test Group 2:

Injecting the plugging material obtained from Embodiment 3 above into sand-packed tubes with permeabilities of 5523.6 mD, 3281.5 mD, and 1125.8 mD. After allowing it to fully cure at 90° C., subsequently, conducting water flooding experiments to measure the plugging rate. Upon completion of the water flooding experiments, observing the distribution pattern of the microspheres in porous media with different permeabilities, which are shown in Table 1 and FIG. 5 below.

Figure 5:
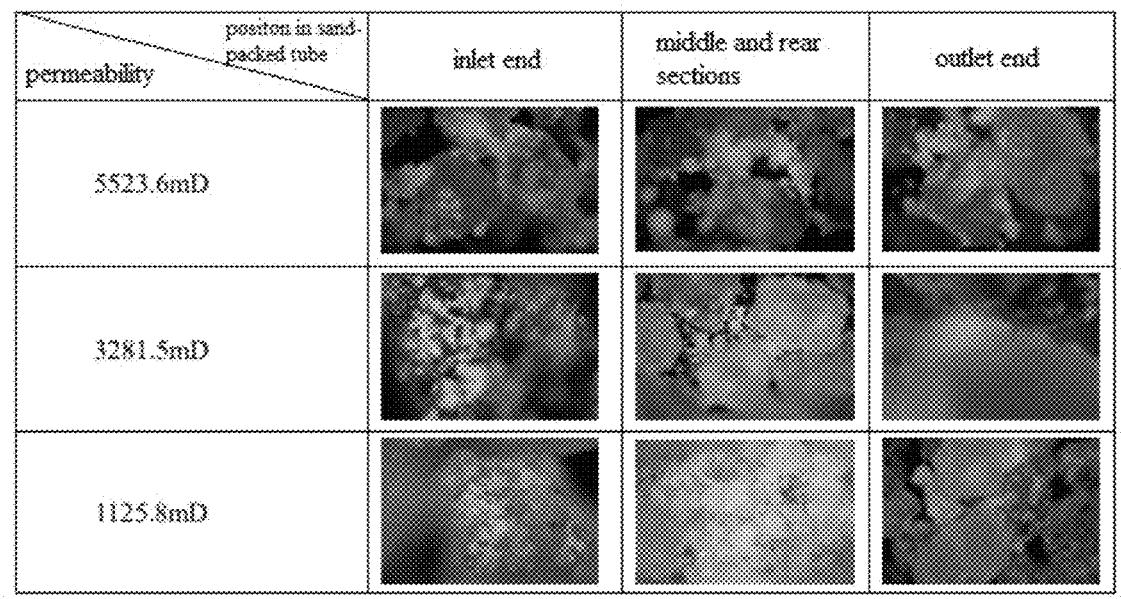
FIG. 5 is the distribution pattern of microspheres prepared in Embodiment 3 of Test Group 2 within porous media of different permeabilities.

Please refer to Table 1 and FIG. 5, as can be seen from Table 1, under the premise of an effective content of 3.75%, the plugging rate of the system reached over 90%, and the particle size of the microspheres could adaptively change with the permeability of the sand-packed tubes. As can be seen from FIG. 5, fewer particles are formed at the inlet end of the sand-packed tubes, with most concentrated in the middle and rear sections. Some of the microspheres cross-linked to form a three-dimensional structure, effectively plugging the pores and fractures.

TABLE 1

Water flooding experimental results of microchannel-controllable self-phase-change microsphere plugging system under different permeabilities

| | | | |
|---|---|---|---|
| Water permeability measurement before plugging/mD | 5523.6 | 3281.5 | 1125.8 |
| Water permeability measurement after plugging/mD | 320.3 | 236.3 | 99.1 |
| Injection volume/PV | 3 | 3 | 3 |

TABLE 1-continued

Water flooding experimental results of
microchannel-controllable self-phase-change microsphere
plugging system under different permeabilities

| Injection rate/mL · min$^{-1}$ | 2 | 2 | 2 |
|---|---|---|---|
| Plugging rate/% | 94.2 | 92.8 | 91.2 |
| Drag coefficient | 2.72 | 3.51 | 4.21 |
| Residual drag coefficient | 12.21 | 12.82 | 14.68 |
| Microsphere particle size range/μm | 30~140 | 20~100 | 20~80 |

Figure 6:
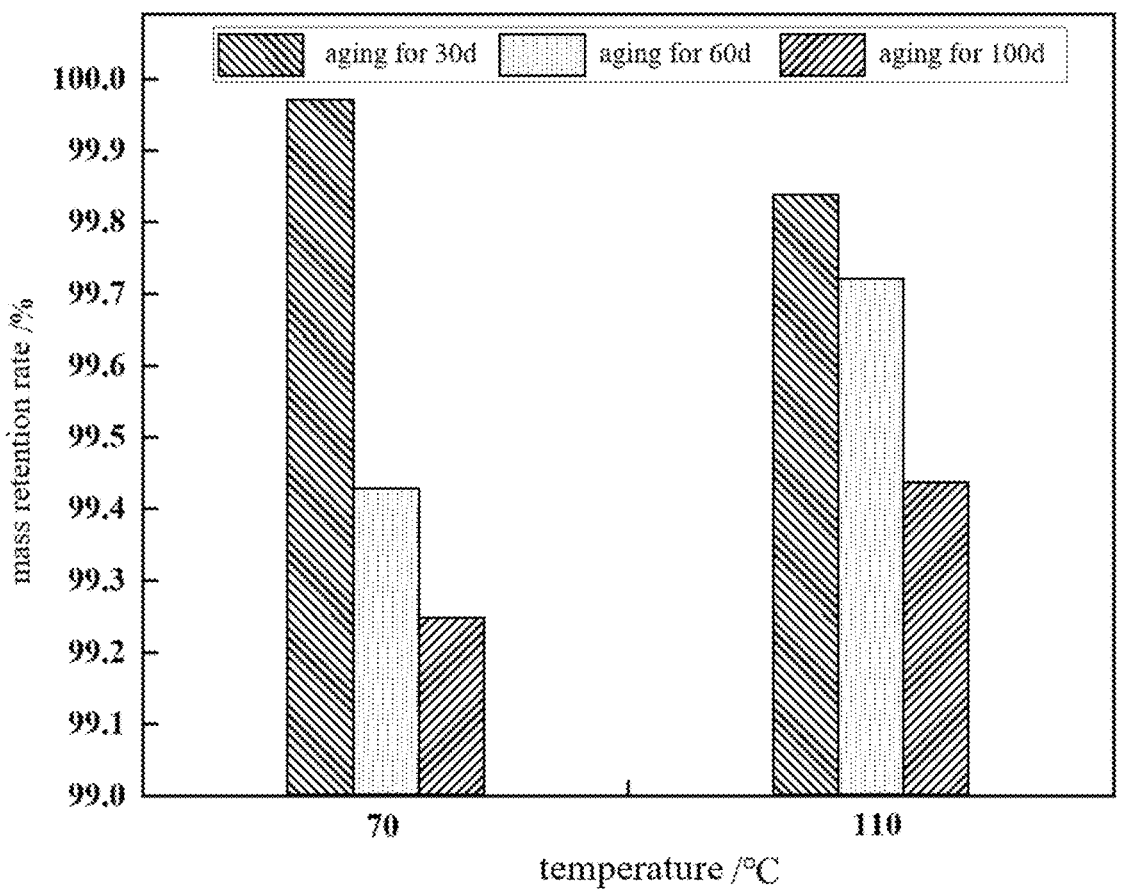
FIG. 6 is the mass retention rate of microspheres after aging, prepared in Embodiment 2 and Embodiment 4 of Test Group 3.
Figure 7:
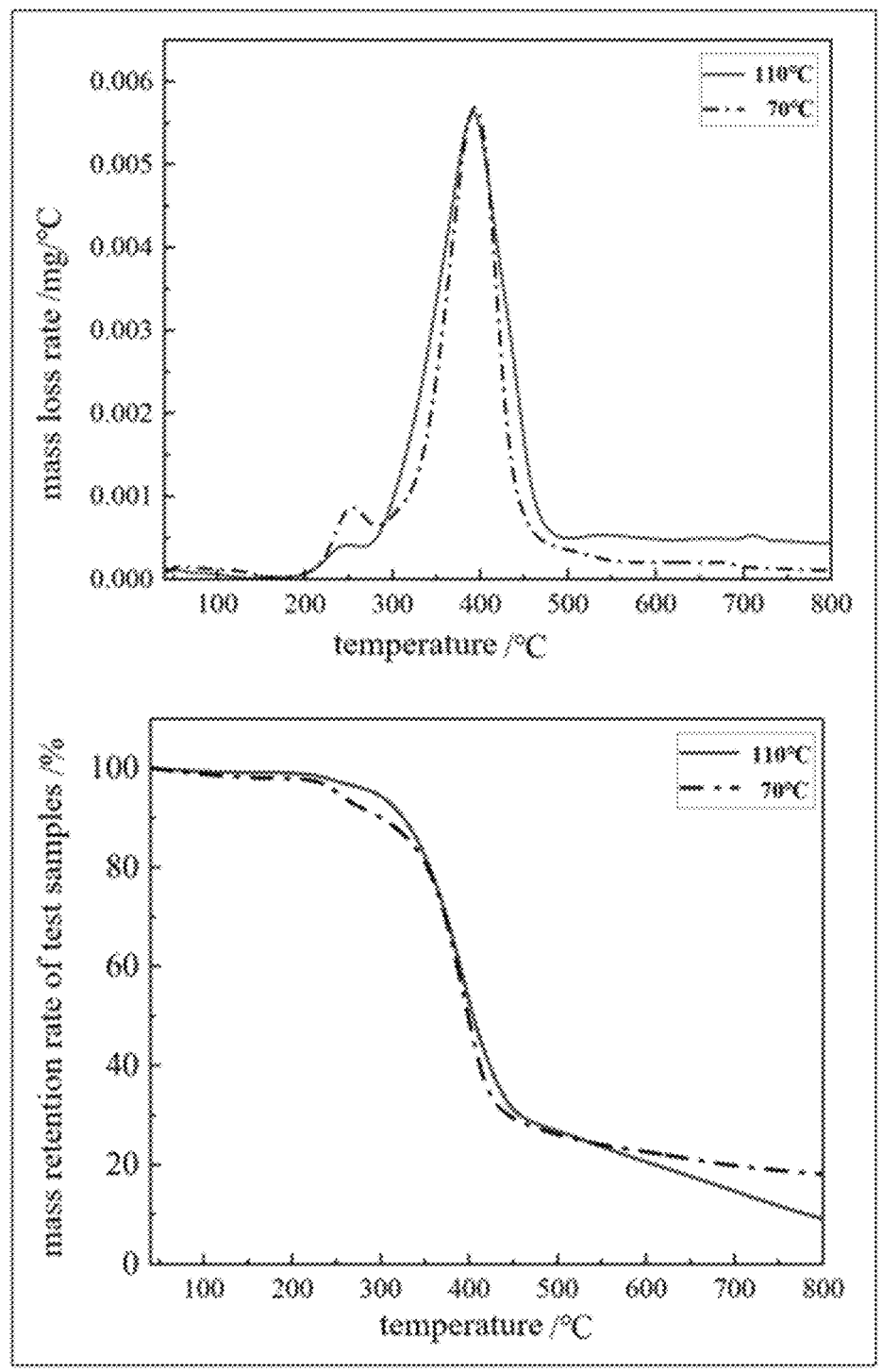
FIG. 7 is the thermogravimetric analysis (TGA) graphs of microspheres prepared in Embodiment 2 and Embodiment 4 of Test Group 3.

Test Group 3:

Conducting thermal stability evaluation and thermogravimetric analysis on the microspheres prepared from Embodiment 2 and Embodiment 4 above, as shown in FIG. 6 and FIG. 7.

Please refer to FIG. 6 and FIG. 7, from FIG. 6, it can be observed that the mass retention rate of the microspheres after aging for 100 days at their corresponding temperatures is above 99%. FIG. 7 indicates that the temperature at which the microspheres lose 5% of their mass is above 250° C., and the temperature at which they lose 10% of their mass is above 300° C. This demonstrates that the microspheres after phase transition exhibit excellent thermal stability and aging resistance, making them capable of meeting the requirements for long-term high-temperature sealing within the reservoir.

Test Group 4:

A comparative evaluation is conducted between Embodiment 3 and Embodiment 6-Embodiment 10 to investigate the impact of varying the amount of PETA-modified bisphenol A epoxy resin and the degree of addition of m-phenylenediamine/methacrylic acid on the phase transition time of the system, as shown in Table 2 below.

Please refer to Table 2. The data presented in Table 2 indicate that by adjusting the reactant ratio of m-phenylenediamine to methacrylic acid and modifying the amount of PETA-modified bisphenol A epoxy resin added, the phase transition time of the system can be effectively controlled. This demonstrates that the water plugging system proposed in this disclosure can achieve precise plugging effects.

TABLE 2 comparison of raw material consumption and phase
transition time in the system

| | PETA-modified bisphenol A epoxy resin/parts | M-phenylenediamine/ methacrylic acid | Phase transition time/h |
|---|---|---|---|
| Embodiment 3 | 1.8 | 1:0.8 | 10~12 |
| Embodiment 6 | 1.8 | 1:1 | 11~14 |
| Embodiment 10 | 2.4 | 1:0.8 | 11~12 |
| Embodiment 7 | 1.8 | 1:1.2 | 8~10 |
| Embodiment 8 | 1.8 | 1:1.4 | 4~7 |
| Embodiment 9 | 1.8 | 1:1.6 | 3~5 |

Test Group 5:

The modified system prepared in Embodiment 3 and the unmodified system (i.e., Comparative Embodiment 1) are injected into two sets of sand-packed tubes with similar permeabilities, respectively. After sufficient aging at 90° C., long-term subsequent water flooding tests are conducted to evaluate the erosion resistance of the different systems.

Please refer to Table 3. The data presented in Table 3 indicate that the mass retention rate and plugging rate for the modified system after 20 PV of water flooding is significantly higher than that of the unmodified system. This suggests that the three-dimensional structure formed by the crosslinking of microspheres in the modified system can effectively enhance the mechanical properties during plugging and improve the erosion resistance of the system.

TABLE 3

Changes in system plugging rate after long-term water flooding

| System | Permeability/ mD | Subsequent water flooding volume/ PV | plugging rate/% | Retention rate of plugging rate after 20PV water flooding/% |
|---|---|---|---|---|
| Modified system | 3584.2 | 5 | 93.6 | 98.8 |
| | | 10 | 93.2 | |
| | | 20 | 92.5 | |
| | 1035.3 | 5 | 92.6 | 97.4 |
| | | 10 | 91.9 | |
| | | 20 | 90.2 | |
| Unmodified system | 3346.5 | 5 | 87.9 | 89.6 |
| | | 10 | 83.4 | |
| | | 20 | 78.8 | |
| | 957.9 | 5 | 85.2 | 88.7 |
| | | 10 | 81.3 | |
| | | 20 | 75.6 | |

The beneficial effects of this disclosure include:

(1) the microchannel-controllable self-phase-transition microsphere plugging system involved the synthesis of PETA-modified bisphenol A epoxy resin, in which PETA molecules were embedded into the bisphenol A epoxy resin chains during the synthesis process; this endowed the microsphere surfaces with potential reactive crosslinking sites; under appropriate activation conditions, crosslinking reactions occurred between the sites on adjacent microsphere surfaces, causing them to aggregate and form a multi-microsphere crosslinking structure; this achieved a synergistic effect between physical and chemical interactions, significantly enhancing the plugging capability of the system after phase transition;

(2) the microchannel-controllable self-phase-transition microsphere plugging system simplifies the composition of existing systems and significantly enhances the temperature and salt resistance of the gel-forming liquid by introducing rigid groups; additionally, the curing time of the system can be adjusted by modifying the ratio of raw materials used in the synthesis of the emulsified curing agent, depending on the plugging location; this allows for adjustable phase transition times between 4 and 12 hours, achieving precise plugging for specific well sections;

(3) the effective content of the microchannel-controllable self-phase-transition microsphere plugging system can reach up to 6.16%, and the viscosity of the gel-forming liquid within the temperature range of 50° C. to 120° C. is as low as 3 to 7 mPa s; this significantly improves the injectability of the gel-forming liquid; moreover, the preparation and application processes are simple, meeting the requirements of practical field applications.

The embodiments of this disclosure mentioned above do not constitute a limitation on the scope of protection of this disclosure. Any other corresponding changes and modifications made based on the technical concept of this disclosure shall be included within the scope of protection of the claims of this disclosure.

What is claimed is:

1. A plugging material, which is prepared from the following raw materials in terms of mass fractions, which comprise: 1 to 3.6 parts of pentaerythritol tetraacrylate (PETA)-modified bisphenol A epoxy resin, 1.5 to 2.4 parts of an addition product of m-phenylenediamine and methacrylic acid, 0.12 to 0.17 parts of nanosilica dispersion liquid, with the remainder being water, such that the sum of the mass fractions of the aforementioned raw materials totals 100 parts.

2. The plugging material according to claim 1, the PETA-modified bisphenol A epoxy resin is prepared through the following steps: mixing bisphenol A epoxy resin, PETA, and a first catalyst to obtain a mixture, and stirring the mixture under a temperature of 40 to 50° C. to obtain the PETA-modified bisphenol A epoxy resin.

3. The plugging material according to claim 2, the PETA-modified bisphenol A epoxy resin is obtained by reacting under nitrogen protection at a temperature of 40° C. to 50° C., with a stirring speed of 100 r/min to 200 r/min, for a duration of 2 h to 4 h.

4. The plugging material according to claim 2, the mass ratio of the bisphenol A epoxy resin to the PETA is 1:0.25 to 1:0.3.

5. The plugging material according to claim 4, the first catalyst is triphenylphosphine, with an addition amount of 0.1% to 2% of the total mass of the bisphenol A epoxy resin and the PETA.

6. The plugging material according to claim 1, the addition product of m-phenylenediamine and methacrylic acid is prepared through the following steps:
mixing m-phenylenediamine, methacrylic acid, and a second catalyst to obtain a mixture, and stirring the mixture under a temperature of 25° C. to 60° C. to obtain the addition product of m-phenylenediamine and methacrylic acid.

7. The plugging material according to claim 6, the mass ratio of the m-phenylenediamine to the methacrylic acid is 1:0.8 to 1:1.6.

8. The plugging material according to claim 7, the second catalyst is potassium carbonate, with an addition amount of 1% to 5% of the total mass of the m-phenylenediamine and the methacrylic acid.

9. A preparing method for a plugging material, wherein the plugging material is prepared from the following raw materials in terms of mass fractions, which comprise: 1 to 3.6 parts of pentaerythritol tetraacrylate (PETA)-modified bisphenol A epoxy resin, 1.5 to 2.4 parts of an addition product of m-phenylenediamine and methacrylic acid, 0.12 to 0.17 parts of nanosilica dispersion liquid, with the remainder being water, such that the sum of the mass fractions of the aforementioned raw materials totals 100 parts;

the preparing method comprises the following steps:
step S1: preparation of oil phase and water phase: mixing PETA-modified bisphenol A epoxy resin and the addition product of m-phenylenediamine and methacrylic acid to form an oil phase mixture; and mixing nanosilica dispersion liquid with water to obtain a water phase mixture;
step S2: emulsification process: pouring the water phase mixture into the continuously stirred oil phase mixture and continue stirring to form a gel-forming liquid;
step S3: curing process: transferring the gel-forming liquid and mixing the gel-forming liquid with dibenzoyl peroxide; stirring and reacting at a temperature of 50° C. to 120° C. to obtain the plugging material.

10. The preparing method for plugging material according to claim 9, in step S2, the duration of continued stirring is 20 to 30 minutes.

11. The preparing method for plugging material according to claim 10, in step S3, the stirring and reaction time at a temperature of 50° C. to 120° C. is 4 hours to 12 hours.

* * * * *